(12) United States Patent
Gandhi et al.

(10) Patent No.: US 10,180,027 B2
(45) Date of Patent: Jan. 15, 2019

(54) WALL STRUCTURE FOR A MORPHING STRUCTURAL MEMBER

(71) Applicant: Toyota Motor Engineering & Manufacturing North America, Inc., Erlanger, KY (US)

(72) Inventors: Umesh N. Gandhi, Farmington Hills, MI (US); Yasuo Uehara, Ann Arbor, MI (US); Danil V. Prokhorov, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 264 days.

(21) Appl. No.: 15/298,240

(22) Filed: Oct. 20, 2016

(65) Prior Publication Data

US 2018/0112398 A1    Apr. 26, 2018

(51) Int. Cl.
*E04B 1/343* (2006.01)
*E04B 1/344* (2006.01)
(Continued)

(52) U.S. Cl.
CPC ............ *E06B 3/481* (2013.01); *B62D 35/004* (2013.01); *E04B 1/344* (2013.01);
(Continued)

(58) Field of Classification Search
CPC ....... Y10T 428/24264; Y10T 428/2419; B64C 3/46; B64C 3/48; B64C 2003/445;
(Continued)

(56) References Cited

U.S. PATENT DOCUMENTS 2,101,836 A * 12/1937 Benedict ................... B63B 3/68
  156/292
2,712,513 A *  7/1955 Breslow .................. E06B 3/481
  156/196
(Continued)

FOREIGN PATENT DOCUMENTS

FR         1468247 A * 2/1967  ............. E06B 3/481

OTHER PUBLICATIONS

Bohnhoff et al., "Bending Properties of Reinforced and Unreinforced Spliced Nail-Laminated Posts", United States Department of Agriculture, Forest Products Laboratory, 1991, 26 pages.
(Continued)

*Primary Examiner* — Robert Canfield
(74) *Attorney, Agent, or Firm* — Christopher G. Darrow; Darrow Mustafa PC

(57) ABSTRACT

A foldable dual-layered wall structure is positionable in a stowed condition and in a deployed condition. The wall structure includes a first foldable layer having at least a first pair of panels and a first joint rotatably connecting the panels of the at least a first pair of panels. A second foldable layer is positioned adjacent to the first foldable layer. The second foldable layer includes at least a second pair of panels and a second joint rotatably connecting the panels of the at least a second pair of panels. The wall structure is structured such that the first joint is positioned directly opposite a panel of the at least a second pair of panels and the second joint is positioned directly opposite a panel of the at least a first pair of panels when the wall structure is in the deployed condition.

19 Claims, 4 Drawing Sheets

(51) Int. Cl.
   *E06B 3/48* (2006.01)
   *B62D 35/00* (2006.01)
   *B64C 3/44* (2006.01)

(52) U.S. Cl.
   CPC .......... *E04B 1/34357* (2013.01); *B62D 35/00* (2013.01); *B64C 2003/445* (2013.01); *Y10T 428/2419* (2015.01); *Y10T 428/24264* (2015.01)

(58) Field of Classification Search
   CPC ....... B62D 35/004; E06B 3/481; E04B 1/344; E04B 1/34357
   USPC ........ 52/2.12, 2.13, 2.19, 2.22, 2.24, 70, 71, 52/84, 632, 783.1; 160/230, 231.1, 84.04, 160/84.08; 220/6, 666; 229/117.01, 229/198.2; 428/181
   See application file for complete search history.

(56) References Cited

U.S. PATENT DOCUMENTS

| | | | | |
|---|---|---|---|---|
| 2,737,411 | A * | 3/1956 | Potter | B62D 35/004 244/130 |
| 2,829,081 | A * | 4/1958 | Sweem | A47G 5/00 156/300 |
| 3,267,989 | A * | 8/1966 | Voisine | E06B 3/94 160/84.11 |
| 3,669,820 | A * | 6/1972 | Fredericks | B32B 3/12 206/585 |
| 3,910,338 | A * | 10/1975 | Pontoppidan | E06B 3/481 160/199 |
| 3,975,872 | A * | 8/1976 | Pinero | E04B 1/344 52/71 |
| 4,388,888 | A | 6/1983 | Gushurst, Jr. | |
| 4,411,373 | A * | 10/1983 | Kupersmit | B65D 5/445 206/591 |
| 4,547,014 | A | 10/1985 | Wicker | |
| 4,550,442 | A * | 10/1985 | Lepisto | B65D 31/04 383/113 |
| 4,595,137 | A * | 6/1986 | Kupersmit | B65D 5/445 229/117.01 |
| 5,005,629 | A * | 4/1991 | Caillet | E06B 3/01 160/35 |
| 5,090,614 | A * | 2/1992 | Kupersmit | B65D 5/36 229/117.04 |
| 5,153,402 | A * | 10/1992 | Quick | B65D 81/3453 219/730 |
| 5,205,333 | A * | 4/1993 | Judkins | E06B 9/262 160/84.02 |
| 5,522,337 | A * | 6/1996 | Meyers | B63G 8/00 114/312 |
| 6,302,181 | B1 * | 10/2001 | Rupel | E06B 9/262 160/84.05 |
| 7,931,067 | B2 * | 4/2011 | Goodman | E05D 15/26 16/365 |
| 7,931,240 | B2 * | 4/2011 | Kothera | B63B 1/248 244/218 |
| 8,061,550 | B2 * | 11/2011 | Browne | B60R 7/043 220/666 |
| 8,777,514 | B2 * | 7/2014 | Heselden | E02D 29/0208 220/4.29 |
| 2008/0247830 | A1 * | 10/2008 | Heselden | E02D 29/0208 405/273 |
| 2008/0279634 | A1 * | 11/2008 | Heselden | E01F 8/025 405/114 |
| 2012/0145706 | A1 * | 6/2012 | Martin | B65D 31/10 220/6 |
| 2013/0139449 | A1 * | 6/2013 | Ho | E04H 1/125 52/71 |

OTHER PUBLICATIONS

Blogger, "How to Do Drywall and Get Professional Results: What is a Staggered Joint?", Jan. 28, 2010, 11 pages.

* cited by examiner

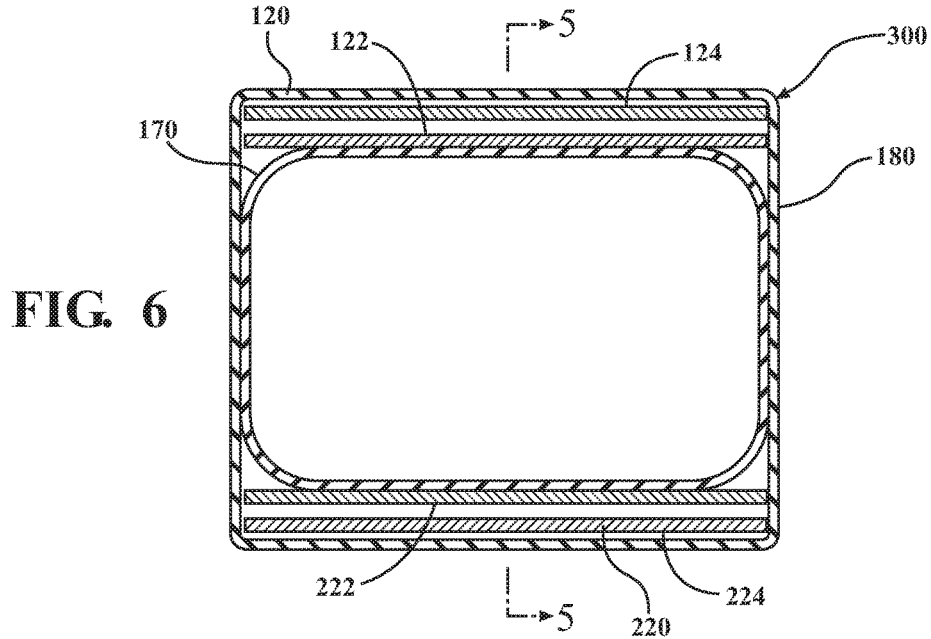
FIG. 6
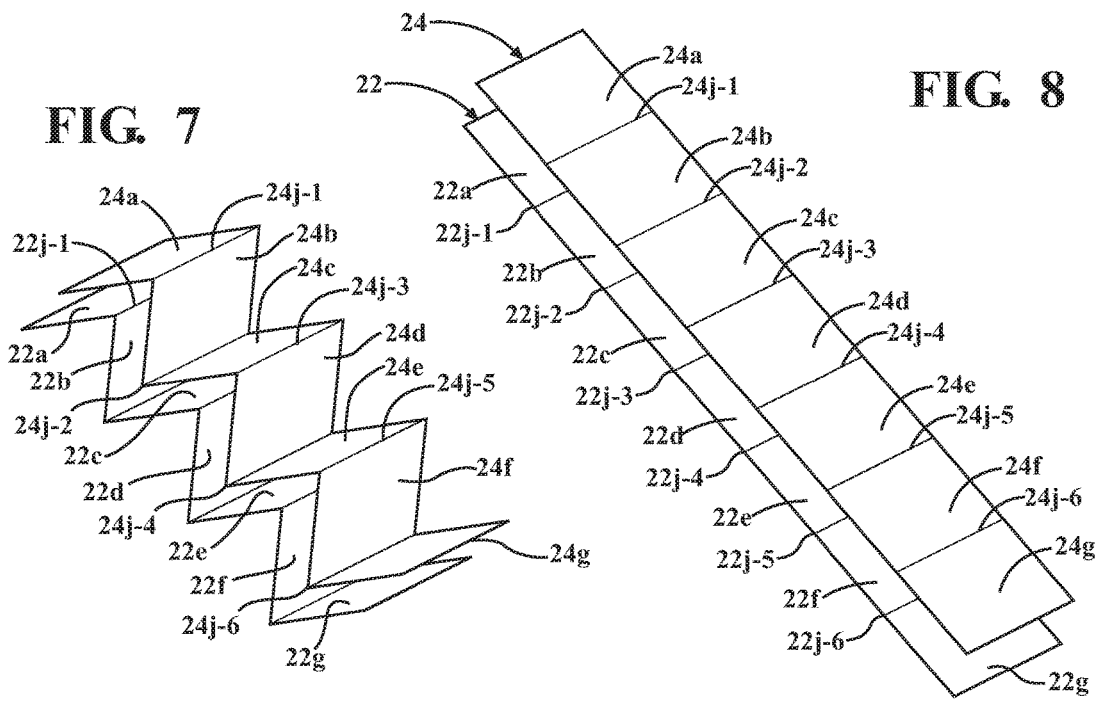
FIG. 7
FIG. 8

US 10,180,027 B2

WALL STRUCTURE FOR A MORPHING STRUCTURAL MEMBER

TECHNICAL FIELD

The present invention relates to morphing structures which are deployable and retractable from a base structure (for example, a vehicle).

BACKGROUND

Deployable morphing structures may be used for a variety of purposes (for example, reduction in aerodynamic drag on vehicles during travel at high speeds). These structures may be attached to a vehicle and maintained in a stowed condition and deployed as needed. The morphing structures may be fabricated from inflatable members, to facilitate smooth and rapid deployment and retraction. However, inflatable members may be vulnerable to puncture and/or excessive deflection due to externally applied forces, which may damage the inflatable member or compromise its effectiveness for its intended purpose.

SUMMARY

In a first aspect of the embodiments described herein, a foldable dual-layered wall structure positionable in a stowed condition and a deployed condition is provided. The wall structure includes a first foldable layer having at least a first pair of panels and a first joint rotatably connecting the panels of the at least a first pair of panels. A second foldable layer is positioned adjacent the first foldable layer. The second foldable layer includes at least a second pair of panels and a second joint rotatably connecting the panels of the at least a second pair of panels. The wall structure is structured such that the first joint is positioned directly opposite a panel of the at least a second pair of panels and the second joint is positioned directly opposite a panel of the at least a first pair of panels when the wall structure is in the deployed condition.

In another aspect of the embodiments described herein, a structural member is provided. The structural member includes at least one foldable dual-layered wall structure positionable in a stowed condition and in a deployed condition. The wall structure has a first foldable layer with a first plurality of panels and a first plurality of joints. Each panel of the first plurality of panels is rotatably connected to an adjacent panel of the first plurality of panels by a joint of the first plurality of joints. A second foldable layer includes a second plurality of panels and a second plurality of joints. Each panel of the second plurality of panels is rotatably connected to an adjacent panel of the second plurality of panels by a joint of the second plurality of joints. Each joint of the first plurality of joints is positioned directly opposite a panel of the second plurality of panels and each joint of the second plurality of joints is positioned directly opposite a panel of the first plurality of panels. The structural member also includes at least one deployment member rotatably connected to at least one of the first foldable layer and the second foldable layer. The structural member also includes an inflatable member operatively coupled to the at least one deployment member such that inflation of the inflatable member moves the at least one deployment member from a first position to a second position. The at least one deployment member is operatively coupled to at least one of the first foldable layer and the second foldable layer such that movement of the at least one deployment member from the first position to the second position moves the at least one of the first foldable layer and the second foldable layer from the stowed condition to the deployed condition. The structural member also includes an outer skin enclosing the at least one foldable dual-layered wall structure, the at least one deployment member, and the inflatable member.

BRIEF DESCRIPTION OF THE DRAWINGS

FIG. 6 is a schematic cross-sectional end view of the structural member shown in FIG. 5.

FIG. 7 is a perspective view of the foldable dual-layered wall structure shown in FIG. 1.

FIG. 8 a perspective view of the foldable dual-layered wall structure shown in of FIG. 2.

DETAILED DESCRIPTION

Described herein is foldable dual-layered wall structure which is positionable in a stowed condition and in a deployed condition. The wall structure includes a first foldable layer and a second foldable layer positioned adjacent the first layer. Each layer is formed from separate panels connected by joints. The joints in each layer are positioned to reside opposite a panel in the adjacent layer. The enables a panel in a first layer to help resist deflection of the second layer due to a force applied at a joint in the second layer, thereby stiffening the wall structure.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
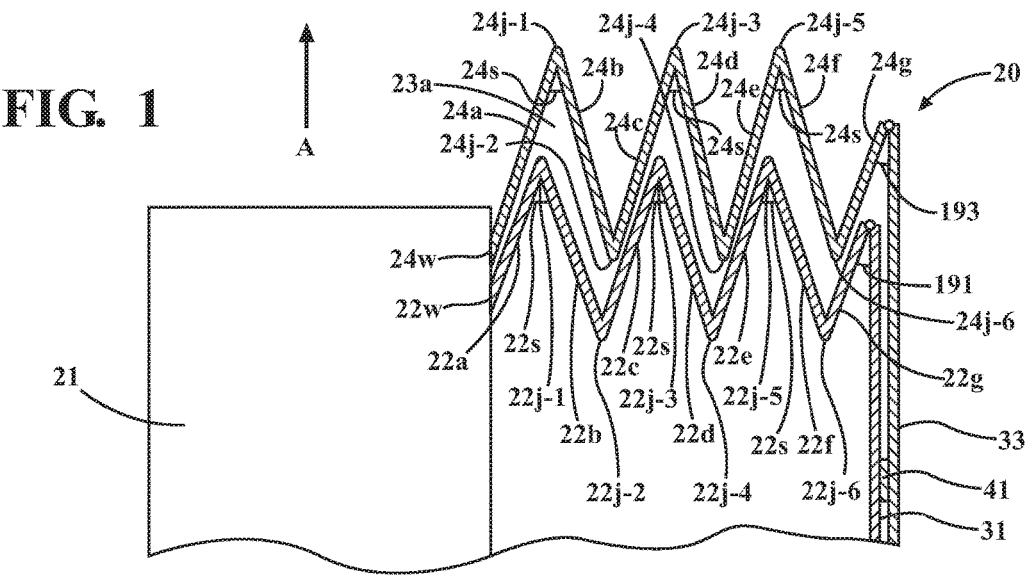
FIG. 1 is a schematic cross-sectional side view of a portion of a wall structure in accordance with an embodiment described herein, shown in a retracted condition.
Figure 2:
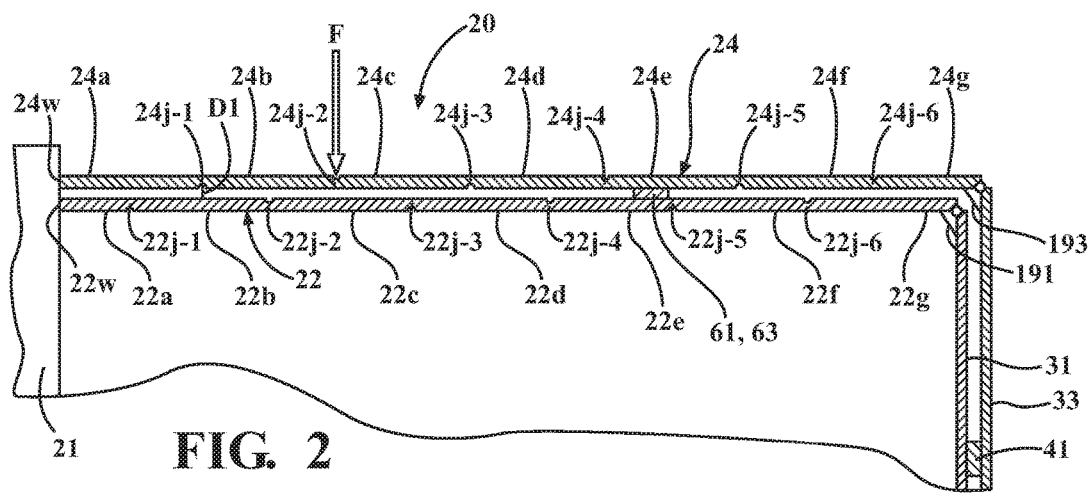
FIG. 2 is a schematic cross-sectional side view of the wall structure in an expanded or deployed condition.

FIGS. 1 and 2 show views of a foldable dual-layered wall structure 20 in accordance with an embodiment described herein. FIG. 1 is a schematic cross-sectional side view of the wall structure 20 in a stowed or folded condition, and FIG.

2 is a schematic cross-sectional side view of the wall structure 20 in an expanded or deployed condition. The foldable wall structure embodiments described herein are positionable in and actuatable between a stowed or folded condition and in a deployed or extended condition. That is, the wall structures are foldable to the configuration shown in FIG. 1, and expandable or deployable to the configuration shown in FIG. 2. The wall structure 20 may support or form a part of a morphing structure (such as the morphing structural member 300 shown in FIG. 5, for example) which may be stowed, deployed when needed, and then retracted to the stowed condition. FIG. 7 is a perspective view of the foldable dual-layered wall structure 20 in a retracted condition, as shown in FIG. 1. FIG. 8 a perspective view of the foldable dual-layered wall structure 20 in a deployed or extended condition, as shown in FIG. 2.

In the embodiment shown in FIGS. 1 and 2, the wall structure 20 includes a first foldable layer 22 of panels having at least one pair of panels 22a and 22b and a joint 22j-1 rotatably connecting the panels 22a and 22b. Additional joints in the first foldable layer 22 connect additional pairs of panels. More specifically, joint 22j-2 rotatably connects panels 22b and 22c, joint 22j-3 rotatably connects panels 22c and 22d, joint 22j-4 rotatably connects panels 22d and 22e, joint 22j-5 rotatably connects panels 22e and 22f, and joint 22j-6 rotatably connects panels 22f and 22g. In the embodiments shown, the panels forming foldable panel layers 22 and 24 are flat panels. However, one or more of the panels forming either of foldable panel layers 22 and 24 may be curved. In addition, a second foldable layer 24 of panels is positioned adjacent the first foldable layer 22 and includes at least another pair of panels 24a and 24b and a joint 24j-1 rotatably connecting the panels 24a and 24b. Additional joints in the second foldable layer 24 connect additional pairs of panels. More specifically, joint 24j-2 rotatably connects panels 24b and 24c, joint 24j-3 rotatably connects panels 24c and 24d, joint 24j-4 rotatably connects panels 24d and 24e, joint 24j-5 rotatably connects panels 24e and 24f, and joint 24j-6 rotatably connects panels 24f and 24g. The rotatable connections between adjacent panels in a panel layer enable the layer of panels to fold as described herein and as shown in FIG. 1 when the foldable layer of panels is stowed or retracted. As shown in the drawings, the connected panels of each layer may form an accordion-like structure when the panel layer is folded.

Referring to FIG. 1, at least one spring member 22s may be positioned to connect adjacent panels of pairs of panels of foldable panel layer 22. Although FIG. 1 shows spring members 22s connecting interior surfaces of adjacent panels of alternating pairs of panels, spring members may be positioned to connect any or all pairs of adjacent panels, if desired. The spring members 22s act to bias relative rotation of the adjacent panels in a direction which urges the first foldable panel layer 22 toward the folded or stowed condition of the wall structure shown in FIG. 1.

In addition, at least one spring member 24s may be positioned to connect adjacent panels of pairs of panels of foldable panel layer 24. Although FIG. 1 shows spring members 24s connecting interior surfaces of adjacent panels of alternating pairs of panels, spring members may be positioned to connect any or all pairs of adjacent panels, if desired. The spring members 24s also act to bias relative rotation of the adjacent panels in a direction which provides the folded condition shown in FIG. 1.

The spring members 22s and 24s are stretched during deployment of the wall structure 20. When the forces extending and maintaining the wall structure 20 in the deployed condition are removed, the spring members 22s and 24s then urge rotation of the adjacent panels with respect to each other so as to return the foldable panel layers 22 and 24 to the folded condition shown in FIG. 1. Spring members 22s and 24s may have any suitable form or forms (for example, coil springs or strips of elastic polymeric material connected at ends thereof to the adjacent panels).

The individual panels comprising the foldable layers described herein may be rigid panels structured to help support, protect from damage, and stiffen a morphing structure as described herein. The panels may be formed from any materials suitable for the purposes described herein, for example, metallic materials, polymers, and/or other materials. In certain embodiments, the panels incorporated into the foldable layers are flat and rectangular. However, the panels may have other shapes according to the requirements of a particular application.

The panels forming the foldable panel layers (such as foldable panel layers 22 and 24) of the foldable wall structures described herein may include end panels and intermediate panels. End panels may be panels which connect a layer of the wall structure to other portions of the morphing structure or to a base from which the morphing structure deploys. For example, in the embodiment shown in FIGS. 1 and 2, a first end panel 22a is structured for rotatable connection to a base 21 at a joint 22w, and is also structured for supporting the layer 22 on the base. Similarly, a second end panel 24a is structured for rotatable connection to the base 21 at a joint 24w spaced apart from the joint 22w by which the first end panel 22a is attached to the base. Second end panel 24a is also structured for supporting the layer 24 on the base 21. Also, another end panel 22g rotatably connects foldable layer 22 to a deployment member 31, and another end panel 24g rotatably connects foldable layer 24 to a deployment member 33. The deployment members 31 and 33 may be formed separately from respective end panels 22g and 24g and may be rotatably connected to the end panels using any suitable method, for example, pins or any other hinge mechanisms (not shown in detail) which permit rotation of the end panels 22g and 24g with respect to the deployment members 31 and 33. Alternatively, one or more of the deployment members 31 and/or 33 may be formed with an associated one of foldable panel layers 22 and 24 as a single piece. The deployment members 31 and 33 may provide bearing surfaces against which expansion forces are exerted (for example, by inflatable member 170 of FIG. 5) during deployment of a morphing structural member as described herein. In an alternative embodiment (not shown), both of foldable panel layers 22 and 24 are rotatably connected to a single deployment member.

Intermediate panels may be panels which are connected to the end panels and to each other, and which reside between the end panels. For example, in the embodiment shown in FIGS. 1 and 2, panels 22b-22f are intermediate panels of foldable panel layer 22, and panels 24b-24f are intermediate panels of foldable panel layer 24.

A "joint" for the purposes described herein may be defined as any device that allows the rotation or pivoting of a second element with respect to a first element, or the rotation or pivoting of a portion of an element with respect to another portion of the element. For example, joints may rotatably connect end panel 22a to base 21 and end panel 22g to deployment member 31. Other joints may rotatably connect the various panels to each other to facilitate folding of the wall structure layers. A joint may have any form suitable for the purposes described herein, and may be formed from any material or materials suitable for the purposes described herein. In a particular embodiment, and as shown in FIGS. 1, 2, 2A, 3, 4, and 5, a foldable layer (such as layer 22 and/or layer 24) may be molded as a single piece to include the constituent panels and connecting hinges or joints (such as joint 24j-1) formed into the structure of the foldable layer. In the example shown, the joints may be formed into the foldable layers as "living hinges".

Figure 4:
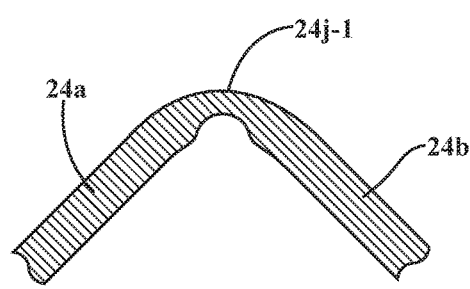
FIG. 4 shows one embodiment of a joint usable for connecting adjacent panels of a panel layer.
Figure 4A:
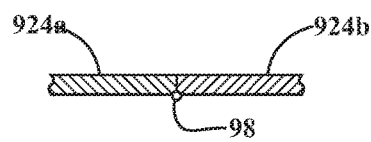
FIGS. 4A-4C show additional embodiments of joints usable for connecting adjacent panels of a panel layer.
Figure 4B:
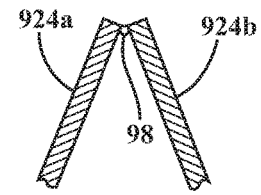

In another example (shown in FIGS. 4A and 4B), one or more joints may be in the form of a pin 98 or other mechanical hinge connecting adjacent panels 924a and 924b of a foldable layer. Pin-receiving structures may be formed in each of the adjacent panels 924a and 924b. FIG. 4A shows a pin 98 connecting panels 924a and 924b with the panels in a deployed or unfolded condition, while FIG. 4B shows the panels 924a and 924b in a folded or stowed condition.

Figure 4C:
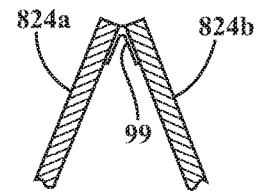

In another example, FIG. 4C shows a flexible connector 99 attached to each of two adjacent panels 824a and 824b. Connector 99 may be formed from a polymeric or other suitable material.

In certain embodiments, each pair of adjacent panels in a given layer may be connected such that the panels are structured to fold with respect to each other only in a single direction. For example, as seen in FIGS. 4A, 4B, and 4C, the joints 98 and 99 are structured so as to enable an associated connected pair of panels to fold outwardly (in direction "A" of FIG. 1 with respect to the wall structure 20), but to resist folding of the panels (and motion of the joint) in the opposite direction. This may further aid in stiffening the wall structure and any structural member into which the wall structure is incorporated.

As seen in FIG. 2, the foldable dual-layered wall structure 20 may be structured such that a first joint (for example, 22j-2) connecting a first pair of panels (for example, panels 22b and 22c) is positioned directly opposite a panel (for example, panel 24b) of a second pair of panels (for example, panels 24b and 24c), and such that a second joint (such as joint 24j-2) connecting the second pair of panels is positioned directly opposite a panel (such as panel 22c) of the first pair of panels 22b and 22c when the wall structure 20 is in the deployed condition. As described herein, the positioning of a joint connecting a pair of panels in a first layer "directly opposite" a panel of a second, adjacent layer means that a shortest distance between the joint in the first layer of panels and the adjacent second layer of panels is a distance between the joint in the first layer and a panel of the second layer, and not a distance between the joint in the first layer and another joint in the second layer.

Figure 2A:
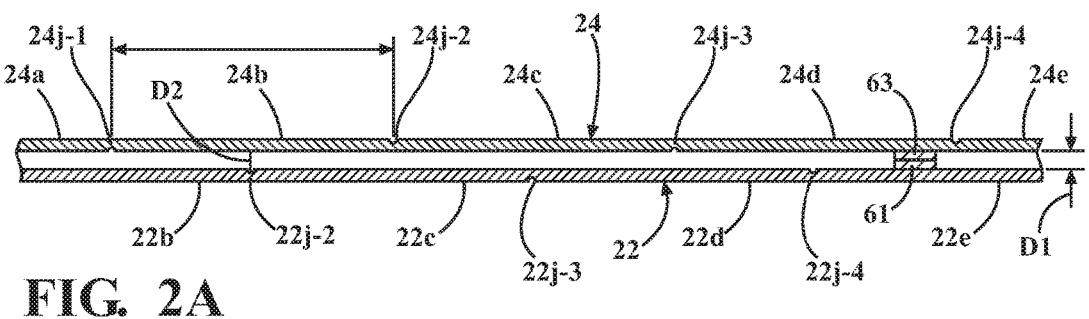
FIG. 2A is a schematic cross-sectional side view of a portion of the wall structure shown in FIG. 2.

In the example shown in FIGS. 2 and 2A, the shortest distance D2 between the joint 22j-2 and the second layer 24 of panels is determined by a line extending from the first joint 22j-2 to the panel 24b. In this example, the panels of the deployed foldable panel layers 22 and 24 are flat and extend parallel to each other. Thus, the line denoting the shortest distance D2 from the joint 22j-2 to the second layer 24 is perpendicular to the panel 24b. In addition, the first foldable panel layer 22 may include another panel 22d rotatably connected to panel 22c by a third joint 22j-3, and the third joint 22j-3 may be positioned directly opposite another panel 24c of the second pair of panels 24b, 24c when the wall structure 20 is in the deployed condition. The arrangements described above are structured so that a force applied to any joint of either of foldable panel layers 22 and 24 (such as force F applied to joint 24j-2 shown in FIG. 2) will be transmitted to a panel of the other one of foldable panel layers 22 and 24, rather than to a joint of the other layer, when the dual-layered wall structure is in the deployed condition.

For example, in the embodiment shown in FIG. 2, layers 22 and 24 may be layers forming or incorporated into a morphing structure, with layer 24 positioned exterior of layer 22. It may be seen that a force F applied to joint 24j-2 may produce a deflection of the second or outer panel layer 24 at the joint 24j-2, but that the force F will be transmitted through the joint 24j-2 to the adjacent panel 22c. Thus, a force applied to any joint (such as joint 24j-2) connecting two panels of an outermost layer will be transmitted to a panel (such as panel 22b) of an inner layer adjacent to the outer layer. This staggering or offsetting of the joints of the outer layer from the joints of the inner layer aids in stiffening the outer layer against externally applied loads, because a joint in the outer layer deflected by an applied load will impinge upon a panel (rather than a joint) of the inner layer, which is positioned directly opposite the joint. This aids in limiting the deflection of the outer layer.

Referring again to FIGS. 1 and 2, a first deployment member 31 may be rotatably connected to end panel 22g. Also, a second deployment member 33 may be rotatably connected to end panel 24g. In addition, as seen in FIGS. 1 and 2, end panel 22g may be connected to deployment member 31 by one or more spring members 191. Similarly, end panel 24g may be connected to deployment member 33 by one or more spring members 193. Spring member(s) 191 may connect end panel 22g to deployment member 31 such that the spring member(s) 191 are forced to stretch or resiliently extend when end panel 22g rotates with respect to deployment member 31 during deployment of foldable layer 22, from the configuration shown in FIG. 1 to the configuration shown in FIG. 2. Similarly, spring member(s) 193 may connect end panel 24g to deployment member 33 such that the spring member(s) 193 are forced to stretch or resiliently extend when end panel 24g rotates with respect to deployment member 33 during deployment of foldable layer 24, from the configuration shown in FIG. 1 to the configuration shown in FIG. 2. Thus, the spring member 191 will tend to bias the end panel 22g and the deployment member 31 toward the folded relationship shown in FIG. 1, and the spring member 193 will tend to bias the end panel 24g and the deployment member 33 toward the folded relationship shown in FIG. 1. This helps ensure rapid folding of the foldable panel layers 22 and 24 into their proper folded configurations during retraction of the foldable layers 22 and 24 in a manner described herein.

Figure 3:
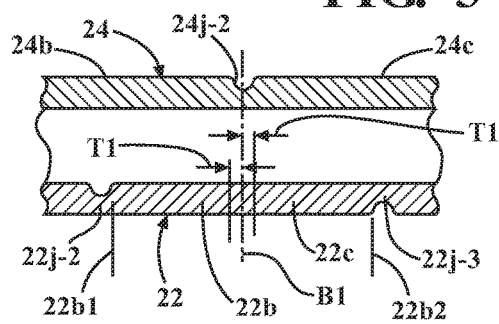
FIG. 3 is a schematic cross-sectional side view of a portion of the wall structure shown in FIG. 2A.

In certain embodiments, and as seen in FIG. 3 for example, a panel 22b of a pair of panels 22b, 22c opposite which a joint 24j-2 is positioned may have a first edge 22b1 rotatably connected to another panel 22a, and a second edge 22b2 opposite the first edge 22b1 connected to another panel 22c. The joint 24j-2 may be positioned directly opposite a location residing midway between the first edge 22b1 and the second edge 22b2 when the wall structure is in the deployed condition. Positioning of a joint directly opposite a location residing midway between a first edge and a second edge of a panel in an adjacent layer may be understood to include positioning of the joint directly opposite a tolerance zone including a line B1 bisecting a length dimension L1 of the panel 22b and extending a distance T1 to either side of the bisector B1. This positioning helps ensure that a joint in one foldable layer is positioned as far as possible from a joint in an adjacent foldable layer, to help ensure that a force applied to a joint in one layer is transmitted to a panel in the adjacent layer.

Also, as shown in FIG. 2, the dual-layered wall structure 20 may be structured so that this staggered arrangement of the joints may be extended along the length of the foldable dual-layered wall structure 20. That is, the first foldable layer 22 may include a first plurality of panels 22a-22g and a first plurality of joints 22j-1 through 22j-6 connecting the panels 22a-22g, with each panel of the first plurality of panels being rotatably connected to an adjacent panel of the first plurality of panels by an associated joint of the first plurality of joints. In addition, the second foldable layer 24 may include a second plurality of panels 24a-24g and a second plurality of joints 24j-1 through 24j-6 connecting the panels 24a-24g. Each panel of the second plurality of panels may be rotatably connected to an adjacent panel of the second plurality of panels by an associated joint of the second plurality of joints.

In addition, each joint of the first plurality of joints 22j-1 through 22j-6 may be positioned directly opposite a panel of the second plurality of panels 24a-24g when the dual-layered wall structure is in the deployed condition. Also, each joint of the second plurality of joints 24j-1 through 24j-6 may be positioned directly opposite a panel of the first plurality of panels 22a-22g when the dual-layered wall structure is in the deployed condition.

Also, as seen in FIG. 1, the wall structure 20 may be structured such that a joint (for example, joint 22j-1 in foldable layer 22) in a first layer of panels may reside within a cavity (for example, cavity 23a) formed between the adjacent connected panels (for example, panels 24a and 24b in foldable layer 24) of the second panel layer when the foldable dual-layered wall structure 20 is in the stowed condition. This arrangement may be applied along the length of the wall structure 20. This arrangement increases the overall compactness of the wall structure 20 and also aids in minimizing the distance between the foldable panel layers 22 and 24 when the wall structure 20 is deployed, thereby ensuring that a force applied to a joint along an exterior layer (such as layer 24) of the wall structure will be transmitted to the panel of the inner layer as soon as possible. This increases the overall rigidity of the wall structure 20.

In the embodiment shown in FIGS. 1 and 2, a first end panel 22a of the first foldable panel layer 22 is rotatably coupled to a base 21 at joint 22w, and a second end panel 24a of the second foldable panel layer 24 is rotatably coupled to the base 21 at joint 24w. The base 21 serves as a mounting structure which supports the wall structure 20 and from which the wall structure 20 may be deployed. The base 21 may be a portion of a vehicle or other structure (not shown) to which the wall structure 20 is attached, or the base 21 may be an element which connects or couples the wall structure 20 to vehicle or other structure. The spacing D1 (FIG. 2A) between the foldable panel layers 22 and 24 of the wall structure 20 may be controlled by appropriately varying the locations of the joints 22w and 24w at which the end panels 22a and 24a are attached to the base 21.

Referring to FIG. 2A, in particular embodiments, engagement features 61 and 63 may be provided on opposed portions of panels of foldable panel layers 22 and 24. The engagement features 61 and 63 may be positioned along portions of the foldable panel layers 22 and 24 which reside opposite each other when the wall structure 20 is deployed. In the embodiment shown, a first engagement feature 61 is provided along a surface of panel 22d on first foldable panel layer 22, and a second engagement feature 63 is provided along a surface of second foldable panel layer panel 24d which resides opposite the first engagement feature 61 when the first and second foldable panel layers 22 and 24 are deployed. The engagement features 61 and 63 are structured to engage each other when the foldable panel layers 22 and 24 are deployed, to help inhibit relative motion between the foldable panel layers 22 and 24 responsive to application of forces applied to one or more of the layers. The surfaces of engagement features 61 and 63 which contact each other may have abrasive or high friction characteristics to aid in inhibiting relative motion between the associated panels and foldable layers. This aids in maintaining the previously-described staggered spatial relationship between the foldable layer joints, which helps ensure that a load applied to a joint in one foldable layer will be resisted by a panel residing opposite the joint in the other foldable layer.

In one embodiment, the engagement feature on each panel is formed integrally with an associated panel. In another embodiment, the engagement feature may be formed separately from the panel and attached to the panel at an appropriate location, using adhesives for example. Such engagement features may be provided at any desired location or locations along the opposed foldable panel layers 22 and 24, according to the needs of a particular application.

Figure 5:
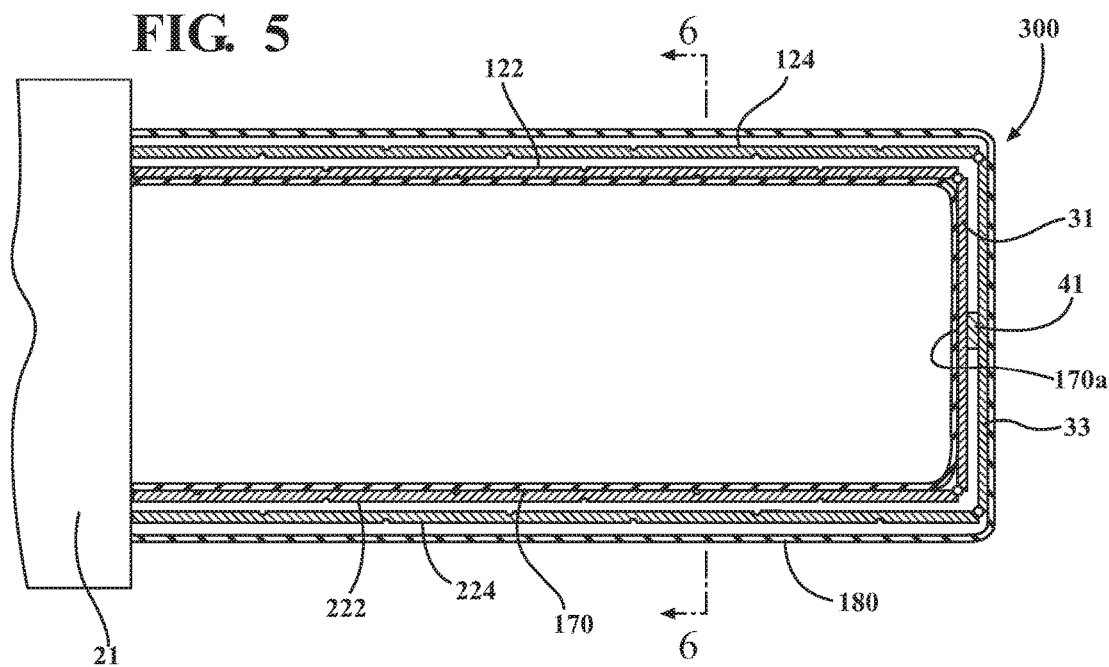
FIG. 5 is a schematic cross-sectional side view of a morphing structural member in accordance with an embodiment described herein, shown in a deployed condition.

Referring now to FIGS. 5 and 6, one or more foldable dual-layered wall structures constructed as previously described may be incorporated into an embodiment of a deployable morphing structural member, generally designated 300. FIG. 5 is a schematic cross-sectional side view of the structural member 300 in a deployed condition, and FIG. 6 is a schematic cross-sectional end view of structural member 300 shown in FIG. 5. The structural member 300 may include an inflatable member 170 sandwiched between a pair of dual-layered wall structures 120, 220 structured similar to the wall structure 20 previously described. Wall structure 120 has two foldable panel layers 122 and 124, and wall structure 220 has two foldable panel layers 222 and 224. Inflatable member 170 may be anchored to base 21 so as to form a gas-tight seal between the inflatable member and the base. Inflatable member 170 may be inflatable to deploy the morphing structural member 300, and deflatable to retract the morphing structural member. Inflatable member 170 may be attached to deployment member 31 at one or more locations (such as at 170a) to help ensure a desired movement of the deployment members 31 and 33 during inflation of the inflatable member 170.

For inflation and deflation of the structural member 300, the vehicle or other structure to which the structural member is attached may be provided with a suitable pumping system (not shown), including any valves and other control elements necessary to enable manual and/or automated control of the deployment and retraction as described herein. The pumping system and structural member 300 are configured so that, upon receipt of a deployment command, inflation of pressurized air or other gas deploys the structural member 300 to the configuration shown in FIG. 5. The pumping system and structural member 300 may also be configured so that, upon receipt of a retraction command, the pressurized gas in the inflatable member 170 is evacuated and/or exhausted, causing the inflatable member and the deployment members 31 and 33 to retract toward the base 21 and the wall structures 120, 220 to assume the folded conditions shown in FIG. 1. The structural member 300 may also be configured so that inflatable member 170 presses against wall structures 120 and 220 when pressurized. This aids in supporting and stiffening the wall structures 120 and 220 against loads applied to the exterior of the structural member 300. In addition, to facilitate retraction of the structural member 300, an end portion of the inflatable member 170 may be attached to deployment member 31, so that when the inflatable member 170 is evacuated, the deployment member 31 moves with the inflatable member 170 in a direction toward base 21.

In an arrangement of foldable panels as described herein, an inner layer of panels may be a layer relatively closer to an interior of the structural member or to the inflatable member, while an outer layer of panels may be a layer spaced outwardly from the inner layer and relatively farther from the structural member interior or the inflatable member. For example, in the embodiment shown in FIGS. 1 and 2, layer 22 may be an inner layer of connected panels and layer 24 may be an outer layer. Also, in the embodiment shown in FIGS. 5 and 6, layer 122 may be an inner layer of connected panels and layer 124 may be an outer layer of connected panels.

In addition, referring to FIGS. 1 and 2, one or more spacers 41 may be attached to one or more of deployment members 31 and 33 and positioned between deployment members 31 and 33. The spacer(s) 41 may help ensure full deployment or extension of the foldable layer 24 by enabling deployment member 31 to press against deployment member 33 during deployment, and may also aid in absorbing excess spacing between the deployment members due to assembly tolerances. The spacer(s) 41 may be formed from a resiliently deflectable material such as a rubber compound. The spacer(s) 41 may also connect the deployment members 31 and 33 so that they move together during deployment and retraction of any structural member into which the deployment members 31 and 33 are incorporated.

Referring to FIGS. 5 and 6, the inflatable member 170 and the wall structures 120, 220 may be enclosed within an outer skin 180. Outer skin 180 may be configured to extend and retract in conjunction with the inflatable member 170 and wall structures 120, 220. For this purpose, the outer skin may be attached to second deployment member 33 so as to move with the deployment member. The outer skin 180 may help immobilize and contain the inflatable member 170 and wall structures 120, 220 within a predetermined volume during motion of a vehicle from which the morphing structure 300 is deployed, and may also increase the aerodynamic efficiency of the morphing structure 300 as it moves through the air. The outer skin 180 may be formed from any suitable foldable material, for example, a fabric material or a rubber or stretchable polymer material.

During deployment of the structural member 300, inflatable member 170 may be inflated with pressurized gas. As the inflatable member 170 is inflated, it presses against deployment member 31 which, in turn, presses against deployment member 33. This forces the wall structures 120 and 220 connected to the deployment members 31 and 33 to unfold, from the condition shown in FIG. 1 to the condition shown in FIGS. 2 and 5. In addition, outer skin 180 is expanded or stretched so as to cover the expanded inflatable member 170 and wall structures 120, 220. The inflatable member 170 unfolds the foldable panel layers 22 and 24 against the return forces exerted by the spring members 22s and 24s connecting pairs of adjacent panels, as previously described.

During retraction of the deployed structural member 300, pressurized gas in the inflatable member 170 is evacuated by the pumping system. As the gas is withdrawn from the inflatable member 170, retraction of the inflatable member 170 pulls the deployment member 31 and the deployment member 33 connected thereto toward base 21. This, in conjunction with the forces exerted by the various spring members connecting pairs of adjacent panels and connecting end panels of the foldable panel layers 122 and 124 with the deployment members 31 and 33 as previously described, acts to fold the panel layers 122, 124 and 222, 224. That is, when the pressure exerted by inflatable member 170 is released, the spring members (not shown in FIG. 5) act to pull the connected panels of foldable panel layers 122 and 124 toward the folded condition shown in FIG. 1. Also, the spring members (not shown) connecting other end panels of foldable panel layers 122 and 124 to the deployment members 31 and 33 draw the end panels toward the folded condition shown in FIG. 1. In addition, outer skin 180 is pulled toward base 21 and folded through the attachment of the outer skin to the second deployment member 33.

FIGS. 6 and 9-11 are schematic cross-sectional end views of alternative embodiments 300, 501, 601 and 701 of morphing structural members. These embodiments may be constructed as previously described, except for the different arrangements of foldable dual-layered wall structures shown. A foldable dual-layered wall structure as described herein may be positioned along the exterior of an inflatable member so as to help protect any desired side or sides of an inflatable member, depending on such factors as available space and the anticipated direction(s) of any externally-applied forces on the inflatable member.

For example, the structural member embodiment 300 of FIG. 6 has a separate foldable wall structure in accordance with an embodiment described herein protecting each of two opposite sides of the inflatable member 170. The structural member 300 includes a foldable dual-layered wall structure 120 is positioned along an exterior of a first side of the inflatable member 170. The foldable dual-layered wall structure 120 may be structured as dual-layered wall structure 20 previously described and, when retracted, may fold into the configuration shown in FIG. 1. Thus, the foldable dual-layered wall structure 120 may include a first foldable panel layer 122 including a first plurality of panels and a first plurality of joints. Each panel of the first plurality of panels may be rotatably connected to an adjacent panel of the first plurality of panels by a joint of the first plurality of joints. The foldable dual-layered wall structure 120 may also include a second foldable panel layer 124. The second foldable panel layer 124 may include a second plurality of panels and a second plurality of joints. Each panel of the second plurality of panels may be rotatably connected to an adjacent panel of the second plurality of panels by a joint of the second plurality of joints. In addition, each joint of the first plurality of joints may be positioned directly opposite a panel of the second plurality of panels, and each joint of the second plurality of joints may be positioned directly opposite a panel of the first plurality of panels, as previously described.

The structural member 300 also includes at least one other foldable dual-layered wall structure 220 in accordance with an embodiment described herein (for example as shown in FIGS. 1-3), which is positioned along an exterior of a second side of the inflatable member directly opposite the first side. Thus, the foldable dual-layered wall structure 220 may provide the structural member 300 with include a third foldable panel layer 222 including a third plurality of panels and a third plurality of joints. Each panel of the third plurality of panels may be rotatably connected to an adjacent panel of the third plurality of panels by a joint of the third plurality of joints. The foldable dual-layered wall structure 220 may also provide the structural member 300 with a fourth foldable panel layer 224 including a fourth plurality of panels and a fourth plurality of joints. Each panel of the fourth plurality of panels may be rotatably connected to an adjacent panel of the fourth plurality of panels by a joint of the fourth plurality of joints. Also, each joint of the third plurality of joints may be positioned directly opposite a panel of the fourth plurality of panels, and each joint of the fourth plurality of joints may be positioned directly opposite a panel of the third plurality of panels, as previously described. The foldable dual-layered wall structure 220 may be attached to base 21 such that, when retracted, the foldable dual-layered wall structure 220 will fold into a configuration which is the mirror image of foldable dual-layered wall structure 120 when wall structure 120 is retracted.

Figure 9:
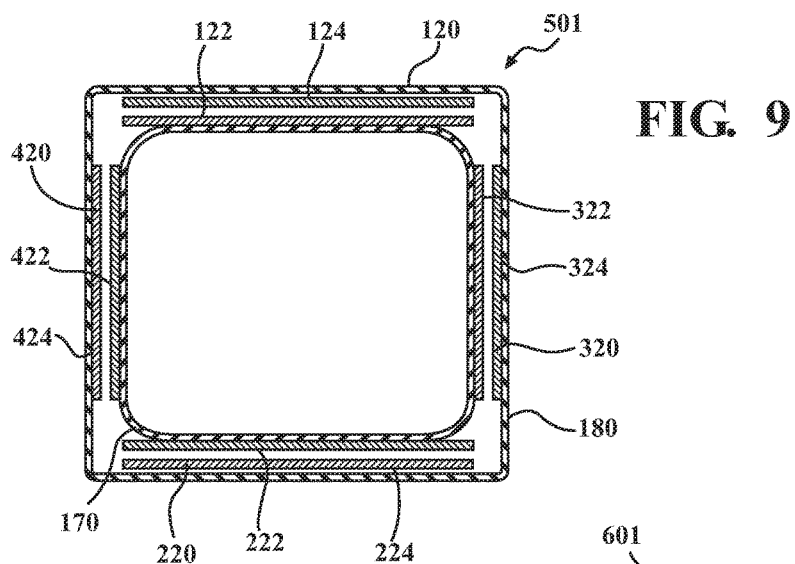
FIG. 9 is a schematic cross-sectional end view of another embodiment of a morphing structural member.

The embodiment of FIG. 9 has a separate foldable wall structure in accordance with an embodiment described herein protecting each of four sides of the inflatable member 170. This embodiment includes a foldable dual-layered wall structure 120 positioned along an exterior of a first side of the inflatable member 170, and a foldable dual-layered wall structure 220 positioned along an exterior of a second side of the inflatable member opposite the foldable dual-layered wall structure 120, as described with respect to FIG. 6. Also, a first additional foldable dual-layered wall structure 320 structured in accordance with an embodiment described herein is positioned along an exterior of a third side of the inflatable member 170 different from the first and second sides of the inflatable member. Thus, in addition to the first and second foldable panel layers 122 and 124 provided by foldable dual-layered wall structure 120 and the third and fourth foldable panel layers 222 and 224 provided by foldable dual-layered wall structure 220, the first additional foldable dual-layered wall structure 320 may provide the structural member 501 with a fifth foldable panel layer 322 including a fifth plurality of panels and a fifth plurality of joints. Each panel of the fifth plurality of panels may be rotatably connected to an adjacent panel of the fifth plurality of panels by a joint of the fifth plurality of joints. The first additional foldable dual-layered wall structure 320 may also provide the structural member 501 with a sixth foldable panel layer 324 including a sixth plurality of panels and a sixth plurality of joints. Each panel of the sixth plurality of panels may be rotatably connected to an adjacent panel of the sixth plurality of panels by a joint of the sixth plurality of joints. In addition, each joint of the fifth plurality of joints may be positioned directly opposite a panel of the sixth plurality of panels, and each joint of the sixth plurality of joints may be positioned directly opposite a panel of the fifth plurality of panels. In addition, a second additional foldable dual-layered wall structure 420 structured in accordance with an embodiment described herein is positioned along an exterior of a fourth side of the inflatable member 170 different from the first, second, and third sides. The second additional foldable dual-layered wall structure 420 may be positioned directly opposite the first additional foldable dual-layered wall structure 320. The second additional foldable dual-layered wall structure 420 may provide the structural member 501 with a seventh foldable panel layer 422 including a seventh plurality of panels and a seventh plurality of joints. Each panel of the seventh plurality of panels may be rotatably connected to an adjacent panel of the seventh plurality of panels by a joint of the seventh plurality of joints. The second additional foldable dual-layered wall structure 420 may also provide the structural member 501 with an eighth foldable panel layer 424 including an eighth plurality of panels and an eighth plurality of joints. Each panel of the eighth plurality of panels may be rotatably connected to an adjacent panel of the eighth plurality of panels by a joint of the eighth plurality of joints. Each joint of the seventh plurality of joints may be positioned directly opposite a panel of the eighth plurality of panels, and each joint of the eighth plurality of joints may be positioned directly opposite a panel of the seventh plurality of panels.

In a particular embodiment, the side of the inflatable member 170 protected by wall structure 120 is a top or uppermost side of the inflatable member, and the side protected by wall structure 220 is a bottom side of the inflatable member. The side protected by wall structure 320 may be a right side of the inflatable member from the perspective of a vehicle to which the morphing structure is attached, and the side protected by wall structure 420 may be a left side of the inflatable member.

Figure 10:
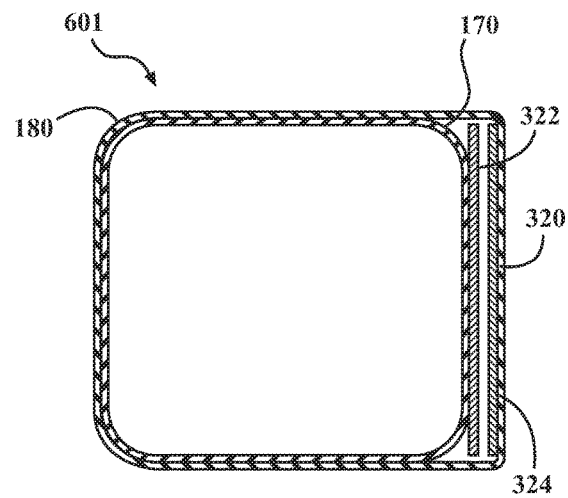
FIG. 10 is a schematic cross-sectional end view of yet another embodiment of a morphing structural member.

FIG. 10 shows another embodiment where a single side of the inflatable member 170 is protected by a foldable dual-layered wall structure 320 in accordance with an embodiment described herein. The foldable dual-layered wall structure 320 has foldable panel layers 322 and 324 incorporated therein. The foldable dual-layered wall structure 320 is also operable as previously described.

Figure 11:
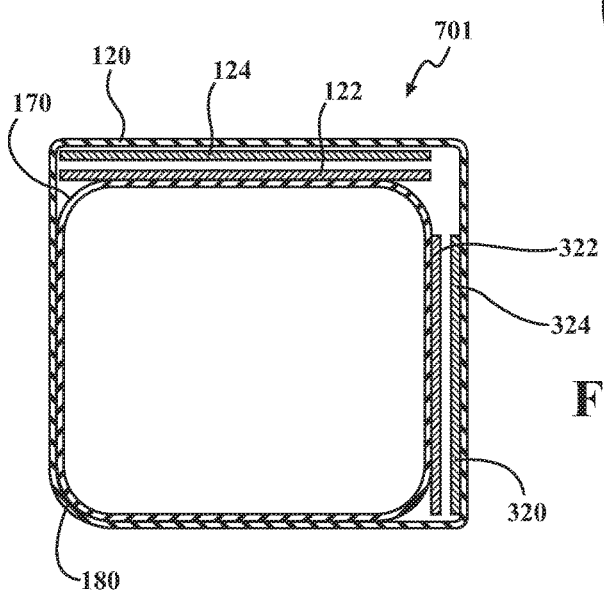
FIG. 11 is a schematic cross-sectional end view of yet another embodiment of a morphing structural member.

FIG. 11 shows an embodiment where two adjacent sides of the inflatable member 170 are protected by foldable dual-layered wall structures 120 and 320 structured in accordance with an embodiment described herein. Foldable dual-layered wall structure 120 is positioned along an exterior of a first side of the inflatable member 170, and the other foldable wall structure 320 is positioned along an exterior of a second side of the inflatable member, where the second side is adjacent the first side. The foldable dual-layered wall structure 120 has foldable panel layers 122 and 124 incorporated therein. The foldable dual-layered wall structure 320 has foldable panel layers 322 and 324 incorporated therein. The foldable dual-layered wall structures 120 and 320 are also operable as previously described.

Although the embodiments of FIGS. 9-11 show up to four arrangements of foldable dual-layered wall structures positioned exterior of the inflatable member, more than four foldable wall structures may be used, depending on the configuration of the inflatable member, the anticipated direction(s) of externally-applied forces, and other pertinent factors.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A foldable dual-layered wall structure which is positionable in a stowed condition and in a deployed condition, the wall structure comprising:
   a first foldable layer including at least a first pair of panels and a first joint rotatably connecting the first pair of panels of the at least a first pair of panels, and
   a second foldable layer positioned adjacent the first foldable layer, the second foldable layer including at least a second pair of panels and a second joint rotatably connecting the panels of the at least a second pair of panels,
   wherein the wall structure is structured such that the first joint is positioned directly opposite a panel of the at least a second pair of panels and the second joint is positioned directly opposite a panel of the at least a first pair of panels when the wall structure is in the deployed condition, and wherein the wall structure is structured such that the first joint resides within a cavity formed between the panels of the at least a second pair of panels when the wall structure is in the stowed condition.

2. The wall structure of claim 1 wherein the first foldable layer includes another panel rotatably connected to a panel of the at least a first pair of panels by a third joint, and wherein the third joint is positioned directly opposite another panel of the at least a second pair of panels when the wall structure is in the deployed condition.

3. The wall structure of claim 1 wherein the panel of the at least a first pair of panels opposite which the second joint is positioned has a first edge rotatably connected to another panel of the at least a first pair of panels, and a second edge opposite the first edge, and wherein the second joint is positioned directly opposite a location residing midway between the first edge and the second edge when the wall structure is in the deployed condition.

4. The wall structure of claim 1 further comprising at least one first engagement feature provided along a surface of a panel of the first foldable layer, and at least one second engagement feature provided along a surface of a panel of a second foldable layer which resides opposite the at least one first engagement feature when the first and second foldable layers are deployed.

5. The wall structure of claim 1 wherein the at least a first pair of panels is connected by at least one spring member structured to bias relative rotation of the at least a first pair of panels in a direction which urges the first foldable layer toward the stowed condition of the wall structure, and wherein the at least a second pair of panels is connected by at least one spring member structured to bias rotation of the at least a second pair of panels in a direction which urges the second foldable layer toward the stowed condition of the wall structure.

6. A structural member comprising a first foldable dual-layered wall structure in accordance with claim 1.

7. The structural member of claim 6 further comprising at least a second foldable dual-layered wall structure in accordance with claim 1.

8. A foldable dual-layered wall structure which is positionable in a stowed condition and in a deployed condition, the wall structure comprising:
    a first foldable layer including a first plurality of panels and a first plurality of joints, each panel of the first plurality of panels being rotatably connected to an adjacent panel of the first plurality of panels by a joint of the first plurality of joints; and
    a second foldable layer including a second plurality of panels and a second plurality of joints, each panel of the second plurality of panels being rotatably connected to an adjacent panel of the second plurality of panels by a joint of the second plurality of joints,
    wherein each joint of the first plurality of joints is positioned directly opposite a panel of the second plurality of panels and each joint of the second plurality of joints is positioned directly opposite a panel of the first plurality of panels when the dual-layered wall structure is in the deployed condition.

9. A structural member comprising a first foldable dual-layered wall structure and a second foldable dual-layered wall structure, each of the first foldable dual-layered wall structure and the second foldable dual-layered wall structure being positionable in a respective stowed condition and in a respective deployed condition, each of the first foldable dual-layered wall structure and the second foldable dual-layered wall structure including:
    a first foldable layer including at least a first pair of panels and a first joint rotatably connecting the first pair of panels of the at least a first pair of panels, and
    a second foldable layer positioned adjacent the first foldable layer, the second foldable layer including at least a second pair of panels and a second joint rotatably connecting the panels of the at least a second pair of panels,
    wherein each of the first foldable dual-layered wall structure and the second foldable dual-layered wall structure is structured such that the first joint is positioned directly opposite a panel of the at least a second pair of panels and the second joint is positioned directly opposite a panel of the at least a first pair of panels when the foldable dual-layered wall structure is in the respective deployed condition.

10. A structural member comprising:
    at least one foldable dual-layered wall structure positionable in a stowed condition and a deployed condition, the wall structure including:
    a first foldable layer having a first plurality of panels and a first plurality of joints, each panel of the first plurality of panels being rotatably connected to an adjacent panel of the first plurality of panels by a joint of the first plurality of joints, and a second foldable layer including a second plurality of panels and a second plurality of joints, each panel of the second plurality of panels being rotatably connected to an adjacent panel of the second plurality of panels by a joint of the second plurality of joints, wherein each joint of the first plurality of joints is positioned directly opposite a panel of the second plurality of panels and each joint of the second plurality of joints is positioned directly opposite a panel of the first plurality of panels;
    at least one deployment member rotatably connected to at least one of the first foldable layer and the second foldable layer;
    an inflatable member operatively coupled to the at least one deployment member, such that inflation of the inflatable member moves the at least one deployment member from a first position to a second position, wherein the at least one deployment member is operatively coupled to at least one of the first foldable layer and the second foldable layer such that movement of the at least one deployment member from the first position to the second position moves the at least one of the first foldable layer and the second foldable layer from the stowed condition to the deployed condition; and
    an outer skin enclosing the at least one foldable dual-layered wall structure, the at least one deployment member, and the inflatable member.

11. The structural member of claim 10 further comprising a second deployment member, wherein the at least one deployment member is rotatably connected to the first foldable layer and the second deployment member is rotatably connected to the second foldable layer.

12. The structural member of claim 10 further comprising a spring member operatively coupling the at least one deployment member to at least one of the first foldable layer and the second foldable layer.

13. The structural member of claim 10 wherein a panel of the first plurality of panels is a first end panel structured for rotatable connection to a base structured for supporting the structural member.

14. The structural member of claim 13 wherein a panel of the second plurality of panels is a second end panel structured for rotatable connection to the base at a location spaced apart from a location at which the first end panel is attached to the base.

15. The structural member of claim 10 further comprising at least one other foldable dual-layered wall structure, the at least one other foldable dual-layered wall structure including:
- a third foldable layer including a third plurality of panels and a third plurality of joints, each panel of the third plurality of panels being rotatably connected to an adjacent panel of the third plurality of panels by a joint of the third plurality of joints; and
- a fourth foldable layer including a fourth plurality of panels and a fourth plurality of joints, each panel of the fourth plurality of panels being rotatably connected to an adjacent panel of the fourth plurality of panels by a joint of the fourth plurality of joints,
wherein each joint of the third plurality of joints is positioned directly opposite a panel of the fourth plurality of panels and each joint of the fourth plurality of joints is positioned directly opposite a panel of the third plurality of panels.

16. The structural member of claim 15 wherein the at least one foldable dual-layered wall structure is positioned along an exterior of a first side of the inflatable member, and the at least one other foldable dual-layered wall structure is positioned along an exterior of a second side of the inflatable member, and wherein the second side is directly opposite the first side.

17. The structural member of claim 16 further comprising a first additional foldable dual-layered wall structure positioned along a third side of the inflatable member different from the first and second sides of the inflatable member.

18. The structural member of claim 17 further comprising a second additional foldable dual-layered wall structure positioned along a fourth side of the inflatable member different from the first, second, and third sides.

19. The structural member of claim 15 wherein the at least one foldable dual-layered wall structure is positioned along an exterior of a first side of the inflatable member, the at least one other foldable dual-layered wall structure is positioned along an exterior of a second side of the inflatable member, and wherein the second side is adjacent the first side.

* * * * *